United States Patent [19]

Trnka

[11] Patent Number: 5,134,799

[45] Date of Patent: Aug. 4, 1992

[54] FISHING LURE

[76] Inventor: Barry Trnka, 103 Dictum Ct., Brooklyn, N.Y. 11229

[21] Appl. No.: 761,512

[22] Filed: Sep. 18, 1991

[51] Int. Cl.⁵ ............................................. A01K 85/00
[52] U.S. Cl. .................................. 43/42.22; 43/42.31
[58] Field of Search ................. 43/42.22, 42.31, 42.39

[56] References Cited

U.S. PATENT DOCUMENTS

| | | | |
|---|---|---|---|
| 1,272,003 | 7/1918 | Cameron | 43/42.31 |
| 2,718,725 | 9/1955 | Thurman | 43/42.31 |
| 3,044,207 | 7/1962 | Dorsett | 43/42.22 |
| 4,098,017 | 7/1978 | Hall | 43/42.31 X |
| 4,638,584 | 1/1987 | Lindsay | 43/42.31 X |
| 4,823,497 | 4/1989 | Pierce | 43/42.31 X |

Primary Examiner—Richard K. Seidel
Assistant Examiner—Patty E. Hong

[57] ABSTRACT

A fishing lure using ball or pellet weights for ballast that are inserted in buoyancy-affecting chambers or passages, in which one or more pellets are frictionally held in a tube prior to placement in the lure at a location selected to coincide with a location relative to the fishing lure body which contributes to a buoyancy thereof providing fishing lure movements resulting from said buoyancy which effectively simulate bait fish swimming movements.

2 Claims, 1 Drawing Sheet

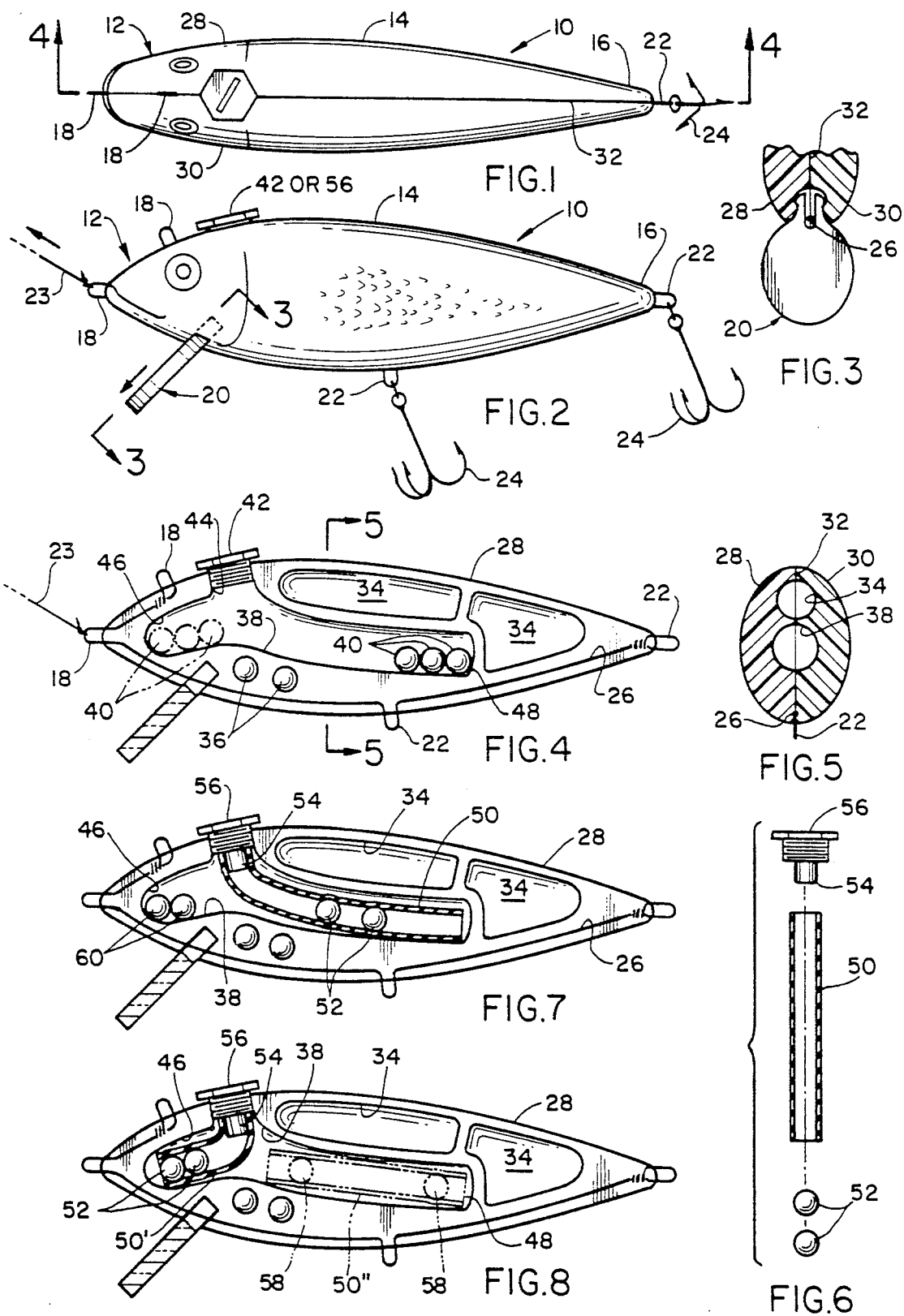

FISHING LURE

The present invention relates generally to a fishing lure having internally placed pellet-type weights functioning as ballast to provide a selected buoyancy to the lure, and more particularly to improvements in the embodiment of these buoyancy-effecting weights within the lure to correspondingly enhance its use in simulating bait fish maneuvers during use of the lure.

EXAMPLE OF THE PRIOR ART

It is already well known to use buoyancy-effecting weights in fishing lures, as exemplified by the fishing lure illustrated and described in U.S. Pat. No. 2,718,725 issued to R. B. Thurman on Sept. 27, 1955 which discloses pellets or balls 17 in internally placed positions within the lure. The balls are freely movable within shaped cavities, which might be straight or serpentine, and when changing position therein correspondingly change the orientation of the lure, depending on whether they lodge in the rear of the cavity or the front, the former imposing a "tail down" attitude to the lure simulating a rising or surfacing bait fish, and the latter a "heads down" attitude, as if the bait fish lure was diving. Skillful maneuvering of the fishing line attache to the lure can effect the assumed position of the freely movable ballast weights, but otherwise there is little or no control provided by current practice.

Broadly, it is an object of the present invention to provide position control over the ballast weights of a fishing lure overcoming the foregoing and other shortcomings of the prior art, and more particularly to achieve by weight position additional lure orientations and angular attitudes to better simulate the fishing maneuvers of the depicted bait fish.

In accordance with the present invention, the weights are not freely movable within the lure, but are confined at selected locations within a length of tube sized to fit within the lure, such that tube position is readily made to coincide with a location relative to the fishing lure body to contribute to a selected buoyancy thereof and fishing lure movements resulting from said buoyancy. Thus, a position maintained for a weight at the rear of the tube might provide a "tail down" orientation, a position at the front of the tube a "head down" orientation, and it is now also possible to maintain a weight position effecting the center of gravity of the lure so as to make it lean or roll to one side, thus permitting the user to impart lure movements imitating a sick or wounded bait fish.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a plan view of a typical fishing lure in a selected fish-attracting shape of a bait fish;

FIG. 2 is a side elevation of the fishing lure of FIG. 1;

FIG. 3 is a partial sectional view as taken along line 3—3 of a detachable so-called fishing lure plane component;

FIG. 4 is an elevational view of the right side body half of the complete fishing lure body as seen in the direction of line 4—4 of FIG. 1;

FIG. 5 is a cross sectional view as taken along line 5—5 of FIG. 4;

FIG. 6 is an exploded isolated view, partly in section, showing the ballast components of the within fishing lure;

FIG. 7 is a view similar to FIG. 4 but showing one embodiment of the ballast components of the present invention in their intended use; and FIG. 8 is another view similar to FIG. 4 and showing a second embodiment of the ballast components of the present invention.

In FIGS. and 2 the general outward fish-attracting appearance of a bait fish is shown embodied in a fishing lure 10. This type lure, of which there are many different shapes and sizes, is in common use for casting, trolling and the like. Commonly, lure 10 has a head section 12, a body section 14 and a tail section 16. An eyelet 18 is provided on the "nose" of the head section and sometimes on the "forehead" as well, for the attachment of a fishing line 23. Lure 10 is usually painted with eyes, mouth, gills, fins and appropriate body colors in likeness to simulate the bait fish it represents. In accordance with current practice, there is on the underside of the head section 12, a planar element 20, set at an angle to the body, which in a well understood manner makes the lure 10 descend in the water as it is manipulated by being drawn forward by the fish line 23. In fishing parlance, component 20 is known by many names such as tip, vane, spoon, deflector and plane. Some plane elements 20 in use are permanently attached, some removable and some even interchangeable (See FIG. 3). Generally plane elements 20 are of clear plastic construction material so as to be invisible, and are sometimes asymmetric to cause the lure 10 to move in a curved path, either left or right, while the lure 10 is forwardly advanced. Still other plane elements 20 (not shown) are made to be replaceable, adjustable or bendable, to achieve desired lure movement responsive to fishing line manipulation.

On the tail 16 and/or on the belly of body section 14, or both, current practice contemplates one or more eyelets 22 that are used to fasten to the lure 10 barbed fish hooks 24 Eyelets 18 and 22 in the embodiment shown, are shaped in a single length of wire 26 which is glued or otherwise fastened in a suitable recess between a right body half 28 and a left body half 32. The within fishing lure 10 is of the type having body halves 28 and 30 which are molded separately and cooperate to produce a symmetrical single body, resulting from the halves 28, 30 being adhesively secured or cemented to each other about a common central plane 32.

In accordance with known practice the construction material selected for lure 10 is typically of a plastic having a buoyancy that will allow it to float, or sink to desired depths. In conjunction with this built-in buoyancy, other factors such as the combination of forward speed, unit density, angle of line tension and directing effect of plane 20, to mention a few, determine the depth and path that lure 10 takes through the water during the fishing use thereof.

The within inventive lure 10 which, as above noted, is manufactured to have left and right body sections, is advantageously provided with buoyancy-effecting compartments 34 formed by the aligned semi-circular passages 38 of the body halves 28, said weight-storage passage being provided in several select locations in the lure body 10, one said location being in the upper lure body near what would be termed the dorsal area. Compartments or air chambers 34 act, as implied, as buoyancy chambers and would, if allowed, maintain the lure 10 in a constantly ascending path, since the chambers 34 diminish the net density of lure 10. For fishing effectiveness, the buoyancy chambers 34 are countered by permanent pellet-type weights 36 located in the air chamber belly portion of the lure 10, i.e., just below the dorsal area.

Users of the fishing lure 10 encounter a myriad of variable ambient conditions such as time of day, sun brightness, wind, shadows, water depth, currents, water clearness, etc., that effect the feeding habits of particular game fish. In an attempt to imitate live bait fish under a given set of conditions, the fisherman manipulates the lure 10 by jiggling line 23, adjusting or changing its plane element 20, or by altering the net density of unit 10 to make it sink faster or slower.

It is accordingly common practice to provide a lure with one or more hollow pockets 38 wherein a number of added weights 40 are inserted (See FIG. 4) through a threaded port 44 closed by a threaded plug 42. Weights 40 as currently used are free to move about within the chamber 38 and typically lodge in the chamber rear portion 48 imposing a "tail down" attitude to lure 10 simulating a rising or surfacing bait fish. Skillful maneuvering by the fisherman may relocate weights 40 into the forward end 46 of chamber 38 to produce a "heads down" attitude, as if the bait fish lure 10 were diving. During use of the free moving weights 40, they are known to produce a "click" when line 23 is jiggled, which is believed to attract curious game fish, but other users contend that the strange noise scares said game fish away. Added weights 40, however, even of the free rolling type, allow the fishermen to get a longer cast, but the full advantage of this is diminished because the weights produce a faster sinking lure 10 once in the water.

In the present invention, and as best shown in FIGS. 6, 7 and 8, a selected length of rubber tube 50 is used to orient and secure a number of weights 52 in a desired location within the centrally located circular passage or chamber 38 which, as noted in the prior art exemplified by FIG. 4 served as a weight-storage closed end passage for free rolling weights. For ease of handling, tubing 50 has one end frictionally attached to an extension 54 which is an integral part of threaded plug 56. Selected numbers of the pellet-type weights can be strategically located within tubing 50 to ultimately determine the ascending and sink rate of lure 10. In its contemplated use, a single lure 10 is intended to be supplied with a length of tubing 50 and a multitude of weights so that the user may make on site assemblies and adjustments.

In one application, not shown, but implied by the description provided, the weights 52 may be arranged near the plug 56 end of tubing 50. This would raise the center of gravity of lure 10 to make it lean or roll to one side, thus permitting the user to impart lure movements imitating a sick or wounded bait fish. If desired, weights 60, may be placed in the front end 45 of compartment 38, and held in place by the rearwardly extending tube 50 occupying the rear end of the compartment 38.

As shown in FIG. 8, the weight or ballast arrangement may be varied wherein weights 52 within a forwardly extending tubing 50 is attached to plug 56. Additionally weights 58 may also be inserted in the rear portion 48 within another piece of tubing 50. The weight-tube ballast arrangement of the present invention thus allows for precise adjustment of weight distribution to effect a desired action of the lure in the water, not heretofore possible with the free rolling weights of FIG. 4.

While the lure embodiments herein shown and disclosed in detail are fully capable of attaining the objects and providing the advantages hereinbefore stated, it is to be understood that they are merely illustrative of the presently preferred embodiments of the invention and that no limitations are intended to the detail of construction or design herein shown other than as defined in the appended claims.

What is claimed is:

1. A fishing lure comprising an adhesively secured together cooperating pair of halves of a body forming a resulting single body having a fish-attracting shape of a bait fish with a front head and a rear tail, each said body half having a semi-circular passage in cross section of a selected length extending from said fish head rearwardly towards said fish tail, said half body semi-circular passages in said single body aligning with each other to bound an internal weight-storage passage for placement therein of pellet weights functioning as ballast during the use of the fishing lure, a selected length of a rubber tube of a diameter sized to fit within said internal weight-storage passage, plural pellet weights of an oversized diameter in relation to said diameter of said tube having an operative position maintained by frictional engagement within said tube, said tube with said frictionally engaged pellet weights having an operative inserted position within said internal weight-storage passage, whereby said tube frictionally holds said pellet weights at said selected location therealong so as to coincide with a location relative to said fishing lure body to contribute to the buoyancy thereof and fishing lure movements resulting from said buoyancy.

2. A fishing lure as defined in claim 1 wherein said tube with a cooperating weight is inserted into and removed from said internal weight-storage passage through an opening located adjacent said fish head, and wherein a plug is provided as a closure for said opening and has an extension to which an end of said tube is frictionally attached.

* * * * *